US010993101B2

(12) United States Patent
Macieira

(10) Patent No.: US 10,993,101 B2
(45) Date of Patent: Apr. 27, 2021

(54) DISCOVERY OF NETWORK RESOURCES ACCESSIBLE BY INTERNET OF THINGS DEVICES

(71) Applicant: Intel Corporation, Santa Clara, CA (US)

(72) Inventor: Thiago J. Macieira, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 23 days.

(21) Appl. No.: 15/855,562

(22) Filed: Dec. 27, 2017

(65) Prior Publication Data

US 2019/0045346 A1    Feb. 7, 2019

(51) Int. Cl.
*H04W 8/00* (2009.01)
*H04W 76/10* (2018.01)
(Continued)

(52) U.S. Cl.
CPC ....... *H04W 8/005* (2013.01); *H04W 52/0254* (2013.01); *H04W 72/02* (2013.01);
(Continued)

(58) Field of Classification Search
CPC . H04W 8/005; H04W 76/10; H04W 52/0254; H04W 84/18; H04W 72/02; H04W 4/70; H04W 52/02; H04W 4/06; H04W 4/80; H04W 4/021; H04W 12/08; H04W 12/06; H04W 4/38; G06F 21/36; G06Q 20/401; H04L 67/125; H04L 12/189; H04L 67/141; H04L 12/24; H04L 41/0823; H04L 41/0866; H04L 67/12; H04L 41/12; H04L 41/0843; H04L 29/08; H04L 12/28; H04L 67/2819; H04L 12/281; H04L 12/2814; H04L 67/1068; H04L 67/1042; H04L 12/26; H04L 29/06; H04L 65/102; H04L 69/08; H04L 43/04; H04L 9/3231;
(Continued)

(56) References Cited

U.S. PATENT DOCUMENTS 9,208,305 B2    12/2015  Bjorn
9,749,420 B2 *  8/2017   Malik ................... H04L 67/125
(Continued)

OTHER PUBLICATIONS

Saminath. V. et al., "Understanding of Internet of Things (IoT) and Experimental Approach using WICED Sense in Android Platform", Jul. 2015, 6 pages, International Journal of Scientific and Research Publications, vol. 5, Issue 7.
(Continued)

*Primary Examiner* — Hardikkumar D Patel
(74) *Attorney, Agent, or Firm* — Schwabe, Williamson & Wyatt, P.C.

(57) ABSTRACT

Apparatuses and methods for initiating a discovery of accessible network resources between Internet-of-Things (IoT) devices upon detection of a user and in advance of a user command are disclosed. A detector is to detect the presence of a user prior to the user issuing a command to an IoT device, and a resource discoverer is to discover and connect to accessible network resources. User commands may be processed following discovery and connection. The detector and resource discoverer may be part of a device controller, and may be part of an IoT device.

26 Claims, 9 Drawing Sheets

(51) Int. Cl.
*H04W 52/02* (2009.01)
*H04W 72/02* (2009.01)
*H04W 84/18* (2009.01)
*H04W 4/70* (2018.01)

(52) U.S. Cl.
CPC .............. *H04W 76/10* (2018.02); *H04W 4/70* (2018.02); *H04W 84/18* (2013.01)

(58) Field of Classification Search
CPC . H04L 9/3236; H04L 63/0861; H04L 69/325; H04L 61/20; H04L 67/16; H04L 12/801; H04L 12/815; H04L 12/851; H04L 12/911; H04L 47/825; H04L 47/2433; H04L 47/22; H04L 47/11; H04L 63/20; H04L 63/107
See application file for complete search history.

(56) References Cited

U.S. PATENT DOCUMENTS

| | | |
|---|---|---|
| 2015/0185713 A1 | 7/2015 | Glickfield et al. |
| 2016/0267913 A1 | 9/2016 | Kim et al. |
| 2019/0297401 A1* | 9/2019 | Kim .................... G06F 11/3447 |

OTHER PUBLICATIONS

Heesik Jeon et al., "An Intelligent Dialogue Agent for the IoT Home", Feb. 2016, 6 pages.
Ehsan Ahvar et al., "Sensor Network-Based and User-Friendly User Location Discovery for Future Smart Homes", Jun. 2016, 17 pages.

* cited by examiner

DISCOVERY OF NETWORK RESOURCES ACCESSIBLE BY INTERNET OF THINGS DEVICES

TECHNICAL FIELD

Embodiments described herein generally relate to the fields of Internet of Things (IoT) devices, and in particular, to systems and methods for discovery of network resources by IoT devices upon detection of a user presence.

BACKGROUND

IoT devices, especially those following the Open Connectivity Foundation (OCF) specifications, may connect to each other in the form of an ad-hoc mesh topology, with multiple peer-to-peer (P2P) connections. IoT devices may be configured to automatically discover and connect to proximate devices, allowing the mesh topology to self-generate. Some IoT devices may be configured to act as relays, thereby enabling information exchange between IoT devices that can exceed the transmission and/or reception range of a single IoT device.

Because the use pattern of IoT devices can tend towards short and infrequent interactions, IoT devices may spend significant time in a sleep or low-power consumption state, during which a given device may disconnect from the mesh. While an IoT device is in a sleep state and is disconnected, proximate devices may disappear and new proximate devices may appear periodically, may change internet protocol (IP) addresses, or may be removed or added. A given IoT device may not be able to rely on a persistent connection to neighboring devices. P2P connections may be short-lived, and may need to be re-established or new P2P connections established where the network topology has changed after an extended period without communication.

DETAILED DESCRIPTION

Figure 1:
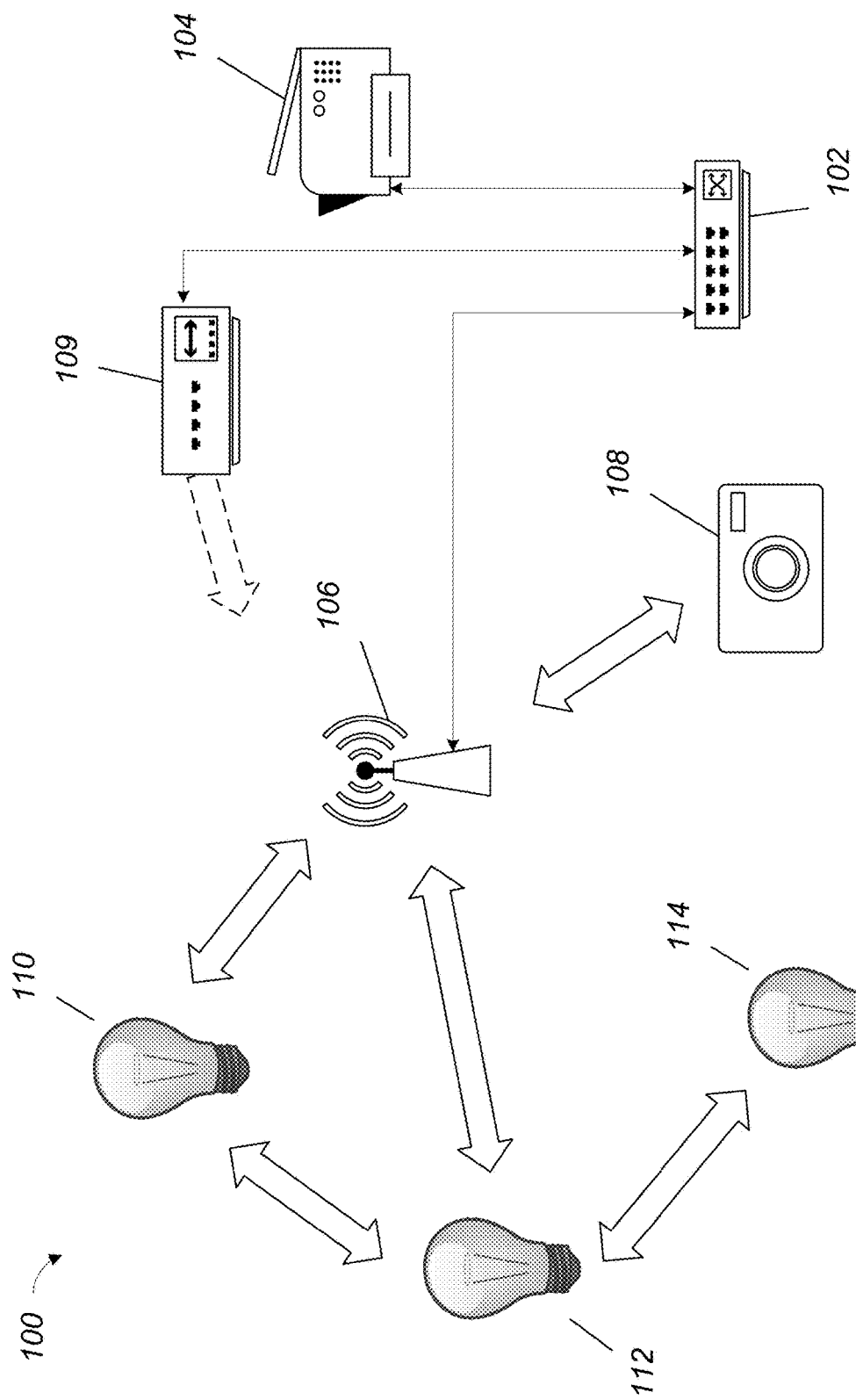
FIG. 1 is a block diagram of the components of a system for discovering network resources by an IoT device upon user detection, according to various embodiments.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Internet of Things (IoT) devices may be physical devices (such as a camera or other consumer electronics), vehicles, appliances, or any other items that may have embedded controllers or microprocessors. IoT devices may further be characterized by their network communications ability to enable IoT devices to connect and transmit or exchange data with other devices and services. This network connectivity may enable an IoT device to be remotely sensed, and in some implementations, configured and controlled, via a network connection. To save power and network resources, IoT devices on a network may be configured to disconnect from other devices and/or the network and enter a sleep or similar low-power mode after a period of inactivity elapses. Upon receiving a wake-up signal, a device may need to reestablish connectivity with its neighbor devices, and/or discover other devices for a network reconfiguration, such as proximate devices where a wireless mesh topology is implemented. IoT devices may be awakened via a variety of methods, including in response to a user of the device issuing a command.

Depending on network topology, the action target of a user command may not be the device receiving the command. For example, on a network that includes a smart lamp (e.g. the lamp allows control of hue and intensity via a smartphone app), a user may issue a command via a smartphone, which itself may connect with a gateway rather than directly to the target lamp. The gateway, in turn, may identify the target lamp from a number of lamps on the network, and forward the command to the target lamp via one or more intermediate nodes. The target lamp and intermediate nodes may be in a low-power state, disconnected from each other and the gateway. Before the user command can be processed, the target lamp and intermediate nodes must be woken and connections reestablished for forwarding the command. The process of waking a device and reestablishing connections may take a noticeable amount of time, especially where a device needs to scan for possible network topology changes and accessible resources. Consequently, a significant delay in execution of the user command may result, detracting from the user experience. In some cases, the delay may result in the user command timing out and not being executed, thus requiring the user to reissue the command.

This potential delay problem can be relieved by having all devices remain constantly connected. However, such a solution can result in an unnecessary waste of energy and network bandwidth, particularly where some devices are infrequently used, and/or are only used for short periods of time. Detecting a user presence prior to command issuance and anticipatorily waking up devices, as described herein, may allow devices to power down when not in use while improving responsiveness to user commands.

As seen in FIG. 1, an example IoT network 100 may comprise an access point or router 102, which may be connected to devices such as a multi-function printer 104 and a wireless access point (WAP) 106. WAP 106, in turn, may connect wirelessly to a variety of IoT devices, which may include consumer devices such as printer 104 and a digital camera 108; one or more appliances, such as devices 110, 112 and 114, which are depicted as lamps; thermostats; heating/ventilation/air conditioning (HVAC) systems; water heaters; security systems; motion detectors; web cameras; televisions; gaming consoles; A/V equipment and/or any other electronic device that may be configured to communicate over a network that is now known or later developed. Each IoT device may vary in its implementation.

Devices may support various types of connections, such as wired and/or wireless network connections, and may support a variety of industry and proprietary communications protocols. Some devices may require a device manager 109 or similar gateway, to which each device connects in a hub-and-spoke configuration. Other devices may be configured to further initiate and receive connections from other IoT devices, such as device 112 directly connecting to device 114 and device 110, thereby forming a mesh network, which may enable lamp 112 to reach other lamps that may be beyond the wireless range of WAP 106. Devices may be configured to offer a hybrid of both topologies, where a device 112 connects to a device manager 109 and accepts direct connections to other devices 110 and 114. Device 112 then may act as a proxy for or relay to device manager 109 for devices 110 and 114.

It will be observed from FIG. 1 that device manager 109 is not directly connected to devices 108, 110, 112 and 114, but is instead connected to router 102. Device manager 109 may connect to devices 108, 110, 112 and 114 via intermediate nodes, namely, router 102 and WAP 106. The connection with each device may be a logical connection rather than physical, operating through OSI model layers 3 and 4 (network and transport layers). Other embodiments of device manager 109 may have direct connections to devices 108, 110, 112 and 114, operating additionally on OSI model layers 1 and 2 (physical and data link layers). It should be understood that while the connections between devices 108, 110, 112 and 114 are wireless via WAP 106, this is only one possible embodiment; other embodiments may have one or more of the various devices 108, 110, 112 and 114 connect via a wired connection. Still other embodiments may have one or more of the various devices 108, 110, 112 and 114 connect via a combination of wired and wireless connections, which further may travel through intermediate nodes. For example, for device 112 to communicate with device manager 109, communications would travel via a wireless connection to WAP 106, then to a wired connection to router 102, and finally a wired connection from router 102 to device manager 109. In embodiments, device manager 109 may be incorporated with teachings of the present disclosure, causing network resources (such as an available connection for the receipt, transmission, and/or relay of messages to other nodes on the network; device exposed functionality; etc.) of an IoT device (such as those described above with reference to devices 110, 112 and 114, e.g. lamps, appliances, computing devices, printers, vehicles, sensors, etc.) to be discovered, in response to detection of a user, prior to the user issuing commands to the IoT device (e.g., read a device status; change the hue of a lamp; sent a thermostat to a desired temperature; turn on heating; etc.), to be described more fully below.

Router 102 may be any device configured to handle routing of data across network 100, and may also act as a gateway to other external networks, e.g. the Internet. WAP 106 may extend the network access offered by router 102 to wirelessly connected devices, such as via WiFi. In some embodiments, WAP 106 may be integrated with router 102 in a single device, such as may be found in a home-based network, where a single box acts as an Internet gateway, router, and wireless access point for devices within the home. In other embodiments, WAP 106 may be part of a larger data network, such as a cellular network, and may connect to router 102 via a number of intermediate transport nodes.

Figure 2:
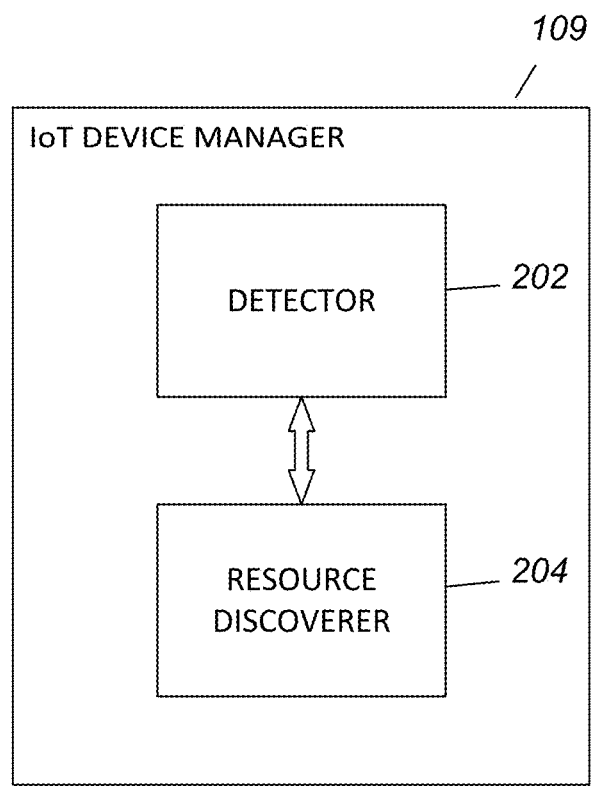
FIG. 2 is a block diagram of the components of a device manager for discovering network resources by an IoT device upon user detection, according to various embodiments.

FIG. 2 depicts the components of device manager 109. Device manager 109 may comprise a detector 202 and resource discoverer 204. In embodiments, device manager 109 may be a standalone box, as depicted in FIG. 1. Other embodiments may have device manager 109 integrated into any of the other components depicted in FIG. 1. For example, some embodiments may integrate device manager 109 into router 102 or WAP 106 (or all three into a single box). Still other embodiments may place device manager 109 into one of the devices 108, 110, 112 and 114, with one of the devices responding directly to user commands. In embodiments where multiple devices 108, 110, 112 and 114 may include a device manager 109, one of the devices 108, 110, 112 and 114 may be designated to act as device manager 109 for all devices. In other embodiments, each may be able to act as a device manager 109 for some or all devices, with selection of the device to act as device manager 109 for a given user interaction being handled arbitrarily, on the basis of proximity, or some other suitable mechanism for selection. Still other embodiments may have a plurality of device managers 109 on network 100, with each device manager 109 being dedicated to a particular type of device, e.g. one device manager 109 may be configured to manage lamps, another may be configured to manage appliances, another may be configured to manage HVAC systems, etc.

User commands may be issued by the user via a smartphone (not depicted) in connection with and accessible to network 100, or by other implements, such as a web browser or dedicated application on a computer. Other embodiments may provide for user commands to be initiated on one of the devices connected to network 100. For example, where a device is a "smart" refrigerator, an interface on the refrigerator may allow a user to control other devices such as lamps. The refrigerator may, in such embodiments, implement the functionality of device manager 109.

Detector 202 may be configured to detect the presence of a user prior to issuance of a user command. A user may be detected in a variety of ways, which may depend upon the types of devices 108, 110, 112 and 114 that are connected to network 100. In some embodiments, detection may be time-based, with detector 202 tracking the times when a user is most likely to issue commands. For example, detector 202 may, via machine learning or another suitable technique, determine that a user typically issues commands to turn on lights around 7 PM, which may coincide to the user returning home. In response, detector 202 may signal resource discoverer 204 to initiate a discovery of, and connect to, accessible network resources, such as smart lamps that may be remotely controlled by the user, just before 7 PM. In another example, detector 202 may receive a signal from a motion detector indicating the presence or physical proximity of a user to an IoT device, and so signal resource discoverer 204. Other techniques for user detection may include detecting sounds made by a user, such as a voice prompt; detecting the presence of a device, tag or other physical token, such as a smartphone or RFID chip; detecting a user via visual indication, such as the user entering into the view of a camera or facial recognition techniques; the user interacting with some interface, such as an interface to an IoT device on network 100, which may include the user launching an app to interface with the IoT device or navigating to a web page provided by or on behalf of the IoT device; a combination of any of the foregoing; or another suitable technique to detecting a user's presence.

It should be recognized that, in some embodiments, one or more devices on network 100 may be involved in user detection, such as where network 100 includes security devices such as cameras, mics, and motion detectors. Detector 202 may employ a combination of the detection techniques discussed above to improve accuracy and potentially reduce false positives. Further, detector 202 may be configured to signal the resource discoverer 204 to initiate discovery of network resources for only a subset of the devices on network 100. The subset of devices may be selected based upon the way in which detector 202 detects a user presence. For example, detector 202 may use a time-based approach to detect when a user is likely to operate lights, and so signal resource discoverer 204 to initiate network resource discovery only on IoT devices such as lamps, while devices such as printer 104 may remain in a low-power state. Conversely, printer 104 may be selected to initiate discovery when detector 202 detects a user interacting with an interface, such as presented on a computer where a user may wish to initiate a print job. Still further, some embodiments may have detector 202 analyze the nature of a user interaction to anticipate the devices with which resource discoverer 204 should initiate network resource discovery. A user may navigate to certain parts of an interface on a smartphone dedicated to particular types of devices, such as opening an app to control an HVAC system or another app to control illumination. Detector 202 may be configured to determine which app a user has opened, and then signal resource discoverer 204 to initiate network resource discovery only with those devices controlled by the app.

Once a user is detected by detector 202, detector 202 may signal resource discoverer 204 to initiate the network resource discovery process. Resource discoverer 204 may be configured to initiate resource discovery for specific types of devices, e.g. lamps, appliances, HVAC, etc., such as in embodiments where different device types may utilize type-specific and/or proprietary protocols. For example, smart lamps from different manufactures may each use a different proprietary control protocol, and so each may require a separate resource discoverer 204, particularly when the specifics of the proprietary control protocol are not made public outside of the manufacturer.

As will be understood, the actual network resource discovery process may depend upon the nature of the device 108, 110, 112 or 114. As part of initiating discovery of accessible network resources, resource discoverer 204 may issue appropriate commands to bring a target device 108, 110, 112 or 114 out of a low-power or sleep state, may signal the device to commence discovery of accessible network resources following wake, and may further facilitate connecting the target device to the discovered network resources. In other embodiments, some of these operations may be automatically carried out by the target device, e.g. resource discoverer 204 may simply need to signal the device to wake, at which point the device 108, 110, 112 or 114 may be configured to begin network resource discovery without further signaling from device manager 109. In embodiments where device manager 109 is part of a device 108, 110, 112 or 114, resource discoverer 204 may be responsible for the detection, discovery, and connection to discovered resources. Other such embodiments may keep device manager 109 in a wake state while the remainder of device 108, 110, 112 or 114 is powered down. Such embodiments may see resource discoverer 204 power up the remainder of device 108, 110, 112 or 114 upon user detection and commence network resource discovery, thus effectively allowing the device to self-initiate discovery.

Some embodiments of device manager 109 may be configured with one or a plurality of detectors 202 and a plurality of resource discoverers 204 to accommodate the range of devices 108, 110, 112 and 114 that may be attached to network 100. Device manager 109 may be implemented in hardware, software, firmware, or a combination of the foregoing. In some embodiments, device manager 109 may be implemented as a hardware device, on a CPU, using discrete components, using an application-specific integrated circuit (ASIC), using a field-programmable gate array (FPGA), or another suitable hardware solution. Further, detector 202 and/or resource discoverer 204 may be discrete modules implemented using separate hardware, or may simply be functional or logical distinctions, with functions of both implemented in a single hardware and/or software package. In still other embodiments, device manager 109 may be specific functionality that is part of a larger apparatus or software implementation.

Figure 3:
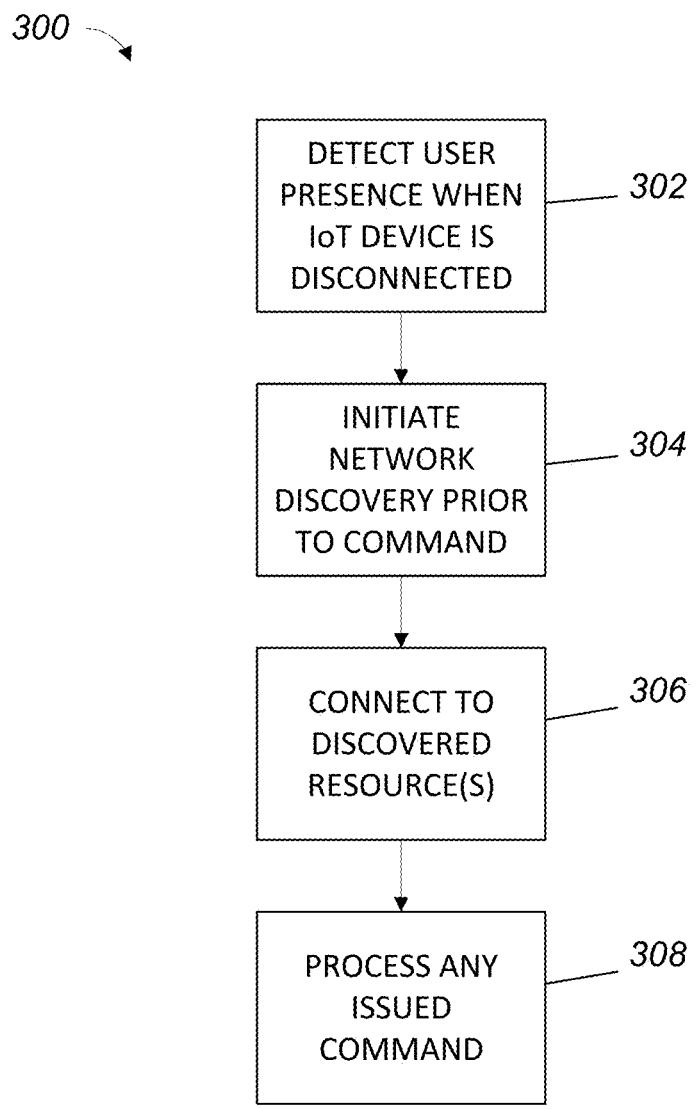
FIG. 3 is a flow chart of a method for discovering network resources by an IoT device upon user detection, according to some embodiments.

FIG. 3 details a method 300 for initiating discovery of network resources on devices 108, 110, 112 and 114 upon detection of a user. Method 300 may be implemented in hardware, software, firmware, or a combination of the foregoing, and may be executed at least in part by a device manager 109 having a processor and memory arrangement. In block 302, the presence of a user may be detected, typically when at least one IoT device 108, 110, 112 or 114 is in a sleep or low-power state. Device manager 109 may be configured to not engage in user detection (and by implication, resource discovery) until at least one device 108, 110, 112 or 114 on network 100 is in a sleep or low-power state, which may save network signaling related to unnecessary discovery attempts. In embodiments, block 302 functionality may be carried out by detector 202.

Following user detection, in block 304, resource discoverer 204 may initiate discovery of accessible network resources for devices 108, 110, 112 and/or 114 prior to a user issuing a command, so that upon command issuance, all necessary network resources are likely to be awake and ready to process the command. As described above, network resource discovery may only be carried out on those devices 108, 110, 112 or 114 that are determined to be relevant to a possible user command.

Once accessible network resources have been discovered, devices 108, 110, 112 and/or 114 may be connected to one or more resources in block 306. Network resources may include other devices 108, 110, 112 or 114, which may further include a particular IoT device that may be the target of a user command. Other possible network resources may include any supporting devices. For example, where a target device 108, 110, 112 or 114 requires Internet connectivity, network resources may include router 102 or another similar gateway. For another example, where the target device is a lamp, accessible network resources may include other lamps and any lamp controllers (which itself may be a device manager 109), such as a dimmer.

Following connection, in block 308 any user commands that may be pending or be subsequently issued may be processed. A device manager 109 may be responsible for processing commands in some embodiments. In other embodiments, user commands may be processed locally at each device 108, 110, 112 or 114, or in a combination between device manager 109 and device 108, 110, 112 or 114. User commands may be device-specific, such as commanding a particular hue and/or illumination level for a lamp, setting a desired temperature and mode of operation for an HVAC system, requesting a video feed from a security or web cam, transferring pictures from a camera, requesting a status query from a refrigerator (e.g. temperature and contents status), activating or deactivating or changing a temperature set on a water heater, or other similar commands.

Figure 4:
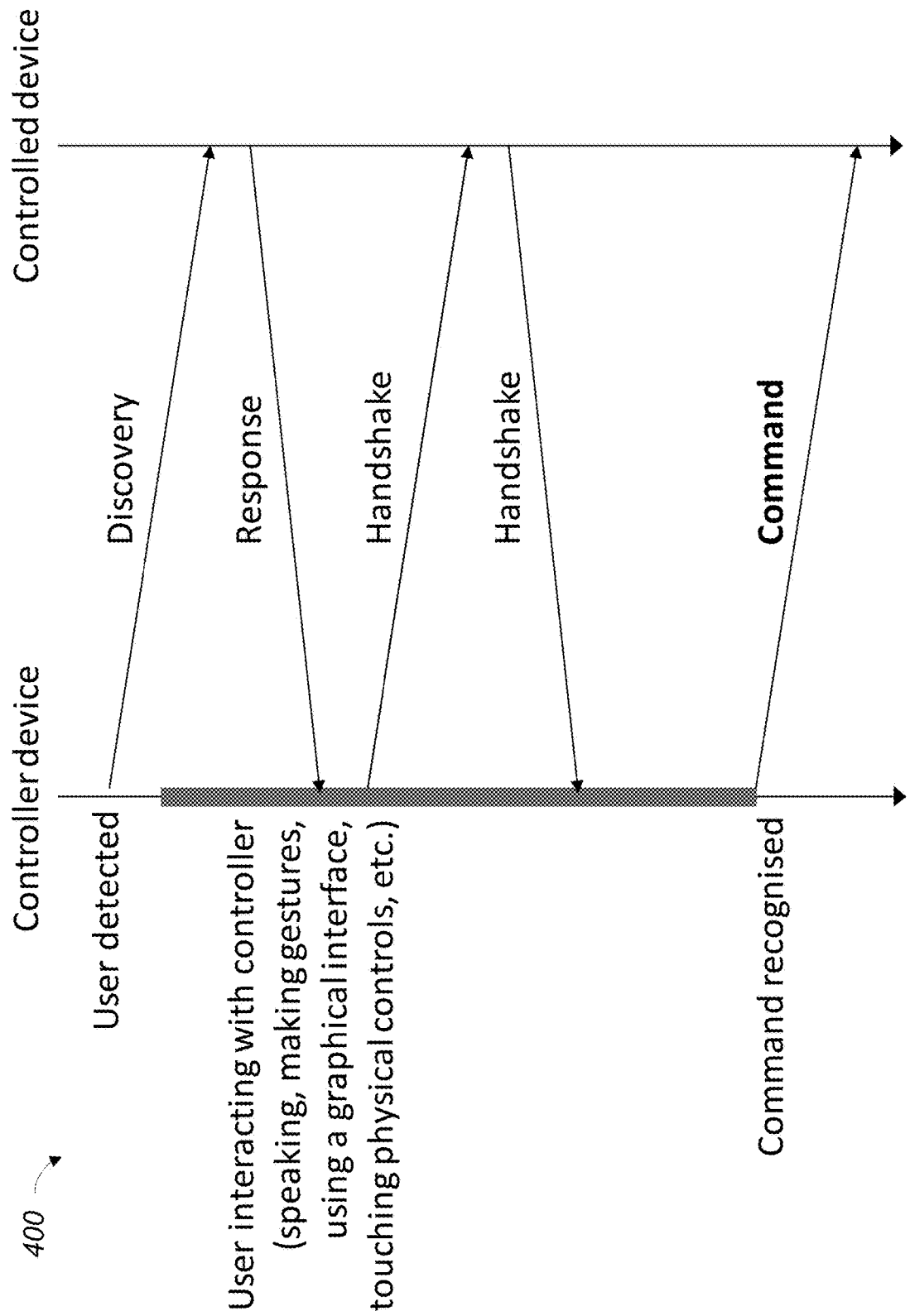
FIG. 4 is a timeline diagram of operations that may be taken by the system of FIG. 1 for discovering network resources by an IoT device upon user detection, according to various embodiments.

Turning to FIG. 4, process 400 details one possible signal flow for waking and network resource discovery between IoT devices 108, 110, 112 and 114 according to some embodiments. Upon user detection, a controller device, such as device manager 109, may initiate resource discovery to discover a controlled device, such as device 108, 110, 112 or 114, which may be the target of a user command. The controlled device may respond to the controller device, indicating its presence and status as an accessible network resource. While a user may be interacting with the controller device, the controller device may initiate a handshake process with the controlled device to connect. During this process, the user may have completed issuing a command, and the controller device may have finished processing and recognizing the command. At this point, the controlled device may be connected to the controller device, and the controller device can issue the user command, or other appropriate commands to carry out the user command, to the controlled device.

It should be understood that the user detection and network resource discovery process between devices 108, 110, 112 and 114 may be an iterative process, with each device 108, 110, 112 and 114 in turn carrying out at least some operations of method 300. A device manager 109 may be responsible for initial user detection, at which point it may proceed with discovering and connecting to accessible network resources. For example, where device manager 109 is a lamp controller for "smart bulbs", the number and location of bulbs may change from time to time, thus changing accessible network resources. Device manager 109 will then need to rediscover the network of smart bulbs, which may start with a bulb or bulbs most proximate to device manager 109. Each bulb, in turn, may be configured to connect not only with device manager 109, but also other proximate bulbs, to generate a mesh topology network. As each bulb proximate to device manager 109 connects to device manager 109, each bulb in turn interprets the connection as a signal of a user presence, and then itself may initiate a discovery of and connection to other accessible network resources, thereby automatically regenerating the mesh network and updating the topology to include added, removed or relocated bulbs. Each bulb may become a node in the network and may be responsible for relaying user commands to a target bulb. Thus, for process 400, each bulb in turn may have the role of a controller device and controlled device.

Figure 5:
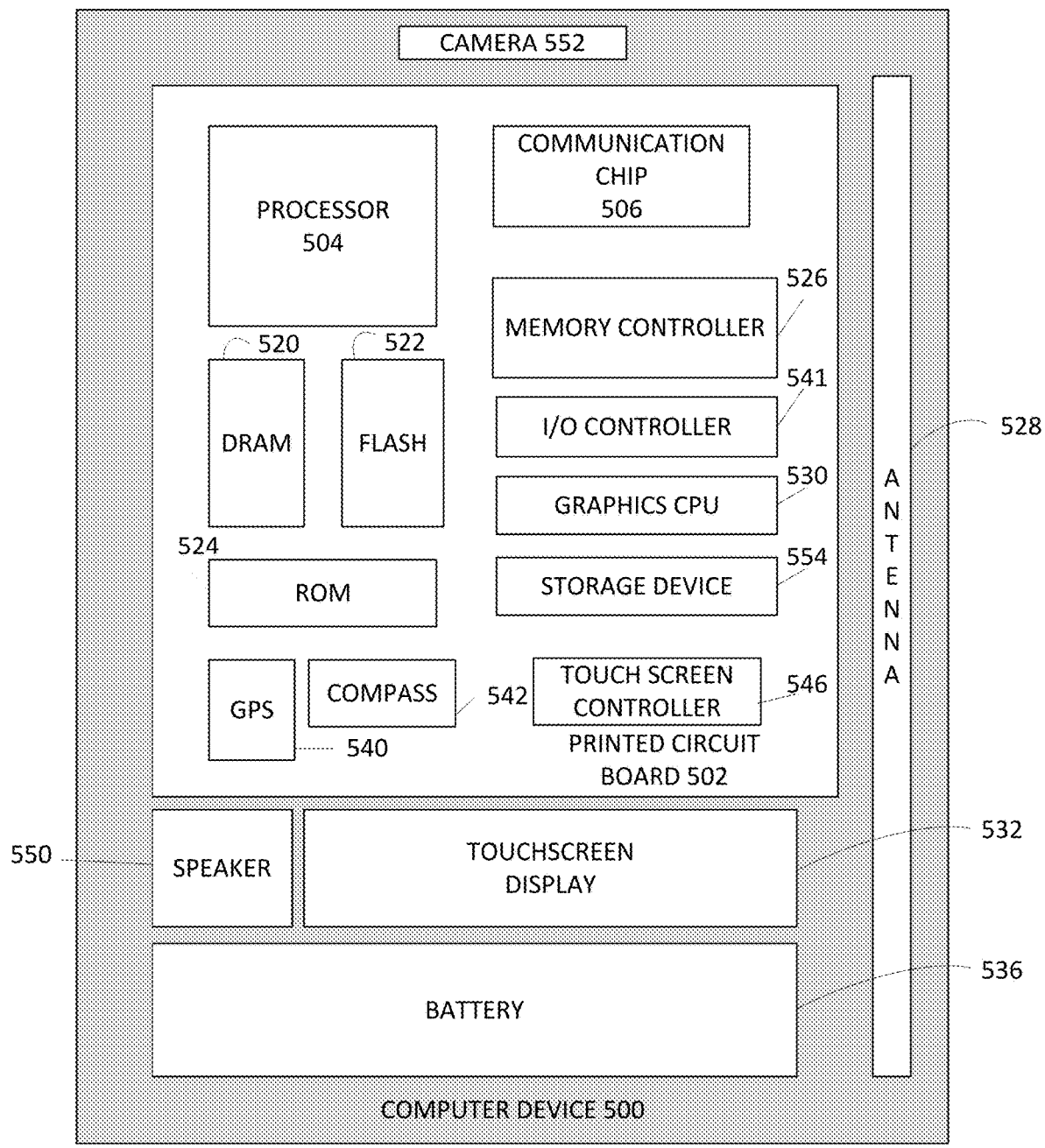
FIG. 5 is a block diagram of an example computer that can be used to implement some or all of the components of the system of FIG. 1, according to various embodiments.

FIG. 5 illustrates an example computer device 500 that may employ the apparatuses and/or methods described herein (e.g., the device manager 109), in accordance with various embodiments. As shown, computer device 500 may include a number of components, such as one or more processor(s) 504 (one shown) and at least one communication chip 506. In various embodiments, the one or more processor(s) 504 each may include one or more processor cores. In various embodiments, the one or more processor(s) 504 may include hardware accelerators to complement the one or more processor cores. In various embodiments, the at least one communication chip 506 may be physically and electrically coupled to the one or more processor(s) 504. In further implementations, the communication chip 506 may be part of the one or more processor(s) 504. In various embodiments, computer device 500 may include printed circuit board (PCB) 502. For these embodiments, the one or more processor(s) 504 and communication chip 506 may be disposed thereon. In alternate embodiments, the various components may be coupled without the employment of PCB 502.

Depending on its applications, computer device 500 may include other components that may be physically and electrically coupled to the PCB 502. These other components may include, but are not limited to, memory controller 526, volatile memory (e.g., dynamic random access memory (DRAM) 520), non-volatile memory such as read only memory (ROM) 524, flash memory 522, storage device 554 (e.g., a hard-disk drive (HDD)), an I/O controller 541, a digital signal processor (not shown), a crypto processor (not shown), a graphics processor 530, one or more antennae 528, a display, a touch screen display 532, a touch screen controller 546, a battery 536, an audio codec (not shown), a video codec (not shown), a global positioning system (GPS) device 540, a compass 542, an accelerometer (not shown), a gyroscope (not shown), a speaker 550, a camera 552, and a mass storage device (such as hard disk drive, a solid state drive, compact disk (CD), digital versatile disk (DVD)) (not shown), and so forth.

In some embodiments, the one or more processor(s) 504, flash memory 522, and/or storage device 554 may include associated firmware (not shown) storing programming instructions configured to enable computer device 500, in response to execution of the programming instructions by one or more processor(s) 504, to practice all or selected aspects of the device manager and network resource discovery up upon user detection of method 300 described herein. In various embodiments, these aspects may additionally or alternatively be implemented using hardware separate from the one or more processor(s) 504, flash memory 522, or storage device 554.

The communication chips 506 may enable wired and/or wireless communications for the transfer of data to and from the computer device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WMAX), Bluetooth, derivatives thereof, as well as any other wireless protocols that are designated as 3G, 4G, 5G, and beyond. The computer device 500 may include a plurality of communication chips 506. For instance, a first communication chip 506 may be dedicated to shorter range wireless communications such as Wi-Fi and Bluetooth, and a second communication chip 506 may be dedicated to longer range wireless communications such as GPS, EDGE, GPRS, CDMA, WiMAX, LTE, Ev-DO, and others.

In various implementations, the computer device 500 may be a laptop, a netbook, a notebook, an ultrabook, a smartphone, a computer tablet, a personal digital assistant (PDA), a desktop computer, or a server. In further implementations, the computer device 500 may be any other electronic device that processes data.

Figure 6:
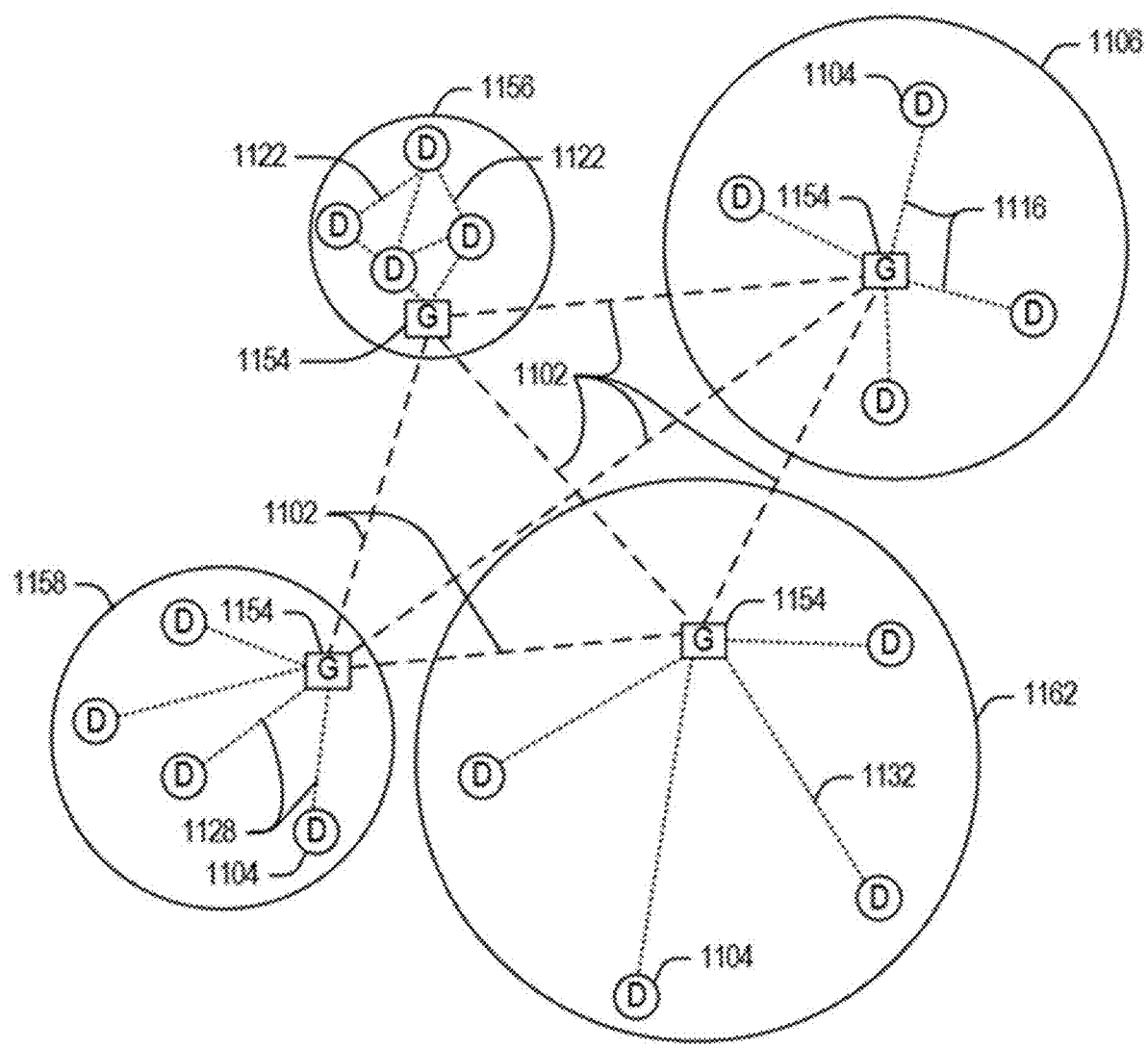
FIG. 6 illustrates an domain topology for respective internet-of-things (IoT) networks coupled through links to respective gateways, according to an example.

FIG. 6 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 7:
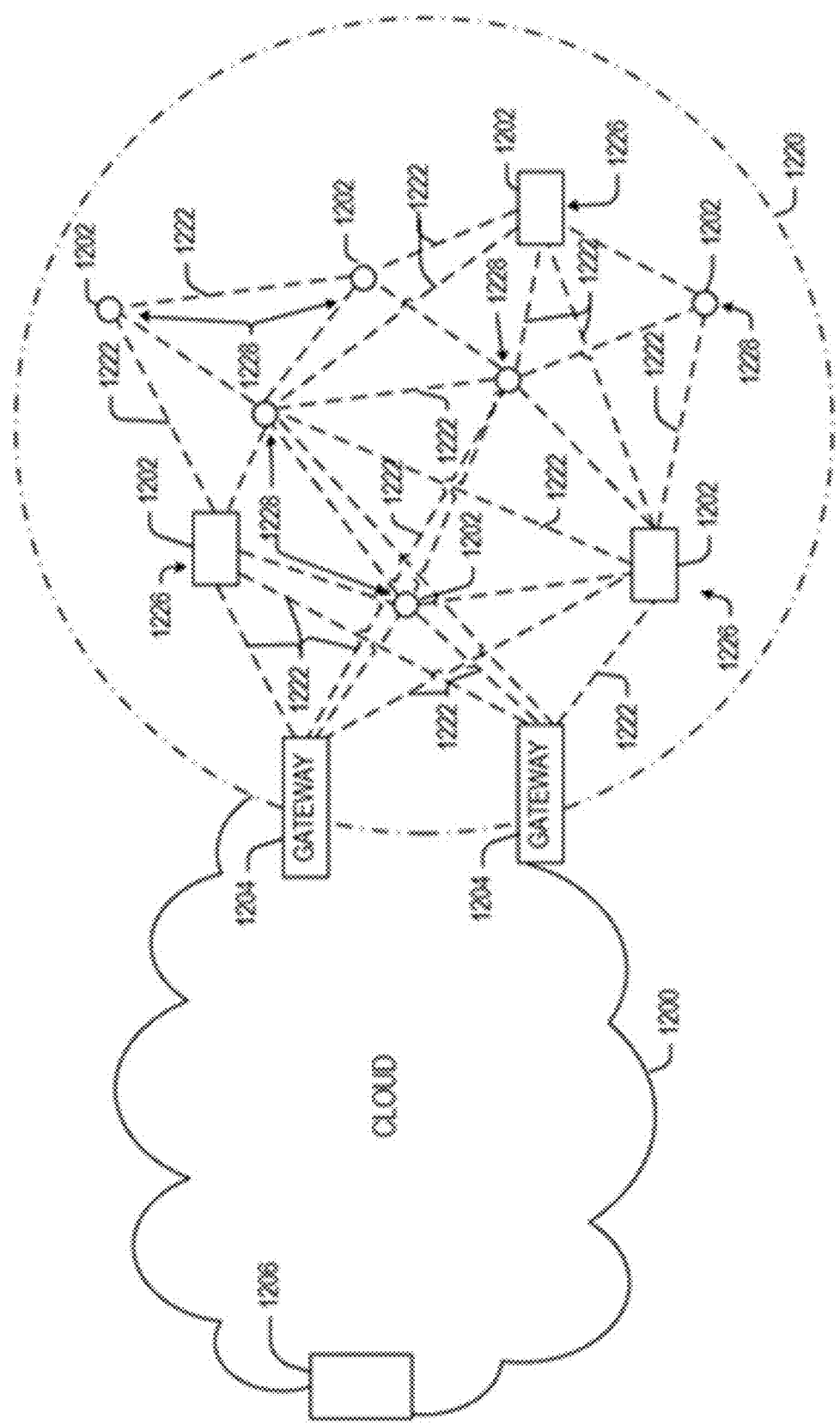
FIG. 7 illustrates a cloud computing network in communication with a mesh network of IoT devices operating as a fog device at the edge of the cloud computing network, according to an example.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 6 and 7, present a number of new challenges in a heterogeneous network of connectivity comprising a combination of wired and wireless technologies.

FIG. 6 specifically provides a simplified drawing of a domain topology that may be used for a number of internet-of-things (IoT) networks comprising IoT devices 1104, with the IoT networks 1156, 1158, 1160, 1162, coupled through backbone links 1102 to respective gateways 1154. For example, a number of IoT devices 1104 may communicate with a gateway 1154, and with each other through the gateway 1154. To simplify the drawing, not every IoT device 1104, or communications link (e.g., link 1116, 1122, 1128, or 1132) is labeled. The backbone links 1102 may include any number of wired or wireless technologies, including optical networks, and may be part of a local area network (LAN), a wide area network (WAN), or the Internet. Additionally, such communication links facilitate optical signal paths among both IoT devices 1104 and gateways 1154, including the use of MUXing/deMUXing components that facilitate interconnection of the various devices.

The network topology may include any number of types of IoT networks, such as a mesh network provided with the network 1156 using Bluetooth low energy (BLE) links 1122. Other types of IoT networks that may be present include a wireless local area network (WLAN) network 1158 used to communicate with IoT devices 1104 through IEEE 802.11 (Wi-Fi®) links 1128, a cellular network 1160 used to communicate with IoT devices 1104 through an LTE/LTE-A (4G) or 5G cellular network, and a low-power wide area (LPWA) network 1162, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 1104, such as over the backbone links 1102, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 1156, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 1158, for instance, may use systems that perform standards conversion to provide multi-standard connectivity, enabling IoT devices 1104 using different protocols to communicate. Further systems may provide seamless interconnectivity across a multi-standard infrastructure comprising visible Internet resources and hidden Internet resources.

Communications in the cellular network 1160, for instance, may be enhanced by systems that offload data, extend communications to more remote devices, or both. The LPWA network 1162 may include systems that perform non-Internet protocol (IP) to IP interconnections, addressing, and routing. Further, each of the IoT devices 1104 may include the appropriate transceiver for wide area communications with that device. Further, each IoT device 1104 may include other transceivers for communications using additional protocols and frequencies. This is discussed further with respect to the communication environment and hardware of an IoT processing device depicted in FIGS. 8 and 9.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 7 below.

FIG. 7 illustrates a cloud computing network in communication with a mesh network of IoT devices (devices 1202) operating as a fog device at the edge of the cloud computing network. The mesh network of IoT devices may be termed a fog 1220, operating at the edge of the cloud 1200. To simplify the diagram, not every IoT device 1202 is labeled.

The fog 1220 may be considered to be a massively interconnected network wherein a number of IoT devices 1202 are in communications with each other, for example, by radio links 1222. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T-.M.A.N.) routing protocol, or the OMA Lightweight M2M (LWM2M) protocol, among others.

Three types of IoT devices 1202 are shown in this example, gateways 1204, data aggregators 1226, and sensors 1228, although any combinations of IoT devices 1202 and functionality may be used. The gateways 1204 may be edge devices that provide communications between the cloud 1200 and the fog 1220, and may also provide the backend process function for data obtained from sensors 1228, such as motion data, flow data, temperature data, and the like. The data aggregators 1226 may collect data from any number of the sensors 1228, and perform the back end processing function for the analysis. The results, raw data, or both may be passed along to the cloud 1200 through the gateways 1204. The sensors 1228 may be full IoT devices 1202, for example, capable of both collecting data and processing the data. In some cases, the sensors 1228 may be more limited in functionality, for example, collecting the data and allowing the data aggregators 1226 or gateways 1204 to process the data.

Communications from any IoT device 1202 may be passed along a convenient path (e.g., a most convenient path) between any of the IoT devices 1202 to reach the gateways 1204. In these networks, the number of interconnections provide substantial redundancy, allowing communications to be maintained, even with the loss of a number of IoT devices 1202. Further, the use of a mesh network may allow IoT devices 1202 that are very low power or located at a distance from infrastructure to be used, as the range to connect to another IoT device 1202 may be much less than the range to connect to the gateways 1204.

The fog 1220 provided from these IoT devices 1202 may be presented to devices in the cloud 1200, such as a server 1206, as a single device located at the edge of the cloud 1200, e.g., a fog device. In this example, the alerts coming from the fog device may be sent without being identified as coming from a specific IoT device 1202 within the fog 1220. In this fashion, the fog 1220 may be considered a distributed platform that provides computing and storage resources to perform processing or data-intensive tasks such as data analytics, data aggregation, and machine-learning, among others.

In some examples, the IoT devices 1202 may be configured using an imperative programming style, e.g., with each IoT device 1202 having a specific function and communication partners. However, the IoT devices 1202 forming the fog device may be configured in a declarative programming style, allowing the IoT devices 1202 to reconfigure their operations and communications, such as to determine needed resources in response to conditions, queries, and device failures. As an example, a query from a user located at a server 1206 about the operations of a subset of equipment monitored by the IoT devices 1202 may result in the fog 1220 device selecting the IoT devices 1202, such as particular sensors 1228, needed to answer the query. The data from these sensors 1228 may then be aggregated and analyzed by any combination of the sensors 1228, data aggregators 1226, or gateways 1204, before being sent on by the fog 1220 device to the server 1206 to answer the query. In this example, IoT devices 1202 in the fog 1220 may select the sensors 1228 used based on the query, such as adding data from flow sensors or temperature sensors. Further, if some of the IoT devices 1202 are not operational, other IoT devices 1202 in the fog 1220 device may provide analogous data, if available.

In other examples, the operations and functionality described above may be embodied by a IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 8:
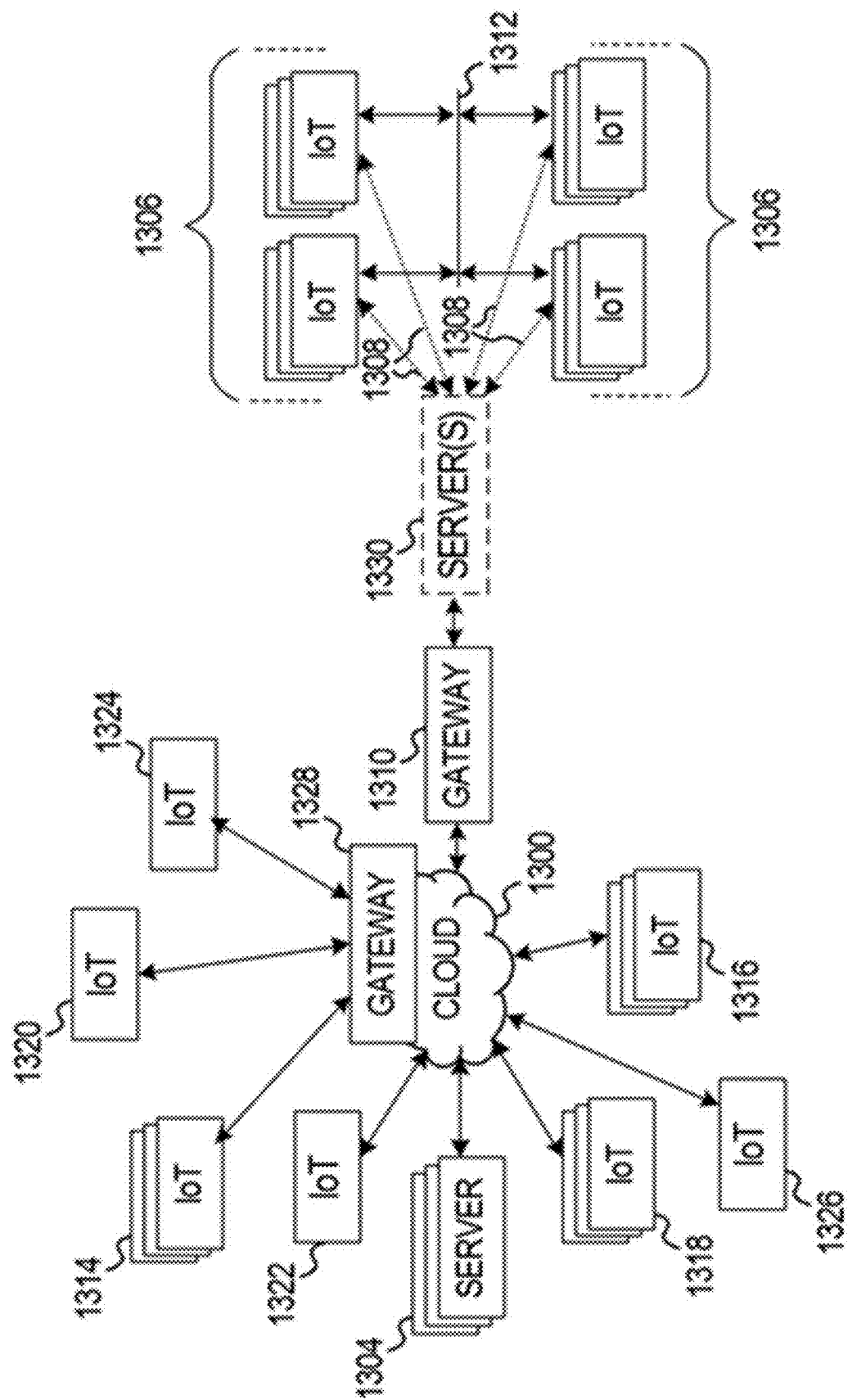
FIG. 8 illustrates a block diagram of a network illustrating communications among a number of IoT devices, according to an example.

FIG. 8 illustrates a drawing of a cloud computing network, or cloud 1300, in communication with a number of Internet of Things (IoT) devices. The cloud 1300 may represent the Internet, or may be a local area network (LAN), or a wide area network (WAN), such as a proprietary network for a company. The IoT devices may include any number of different types of devices, grouped in various combinations. For example, a traffic control group 1306 may include IoT devices along streets in a city. These IoT devices may include stoplights, traffic flow monitors, cameras, weather sensors, and the like. The traffic control group 1306, or other subgroups, may be in communication with the cloud 1300 through wired or wireless links 1308, such as LPWA links, optical links, and the like. Further, a wired or wireless sub-network 1312 may allow the IoT devices to communicate with each other, such as through a local area network, a wireless local area network, and the like. The IoT devices may use another device, such as a gateway 1310 or 1328 to communicate with remote locations such as the cloud 1300; the IoT devices may also use one or more servers 1330 to facilitate communication with the cloud 1300 or with the gateway 1310. For example, the one or more servers 1330 may operate as an intermediate network node to support a local edge cloud or fog implementation among a local area network. Further, the gateway 1328 that is depicted may operate in a cloud-to-gateway-to-many edge devices configuration, such as with the various IoT devices 1314, 1320, 1324 being constrained or dynamic to an assignment and use of resources in the cloud 1300.

Other example groups of IoT devices may include remote weather stations 1314, local information terminals 1316, alarm systems 1318, automated teller machines 1320, alarm panels 1322, or moving vehicles, such as emergency vehicles 1324 or other vehicles 1326, among many others. Each of these IoT devices may be in communication with other IoT devices, with FIG. 7), or a combination therein. The groups of IoT devices may be deployed in various residential, commercial, and industrial settings (including in both private or public environments).

As can be seen from FIG. 8, a large number of IoT devices may be communicating through the cloud 1300. This may allow different IoT devices to request or provide information to other devices autonomously. For example, a group of IoT devices (e.g., the traffic control group 1306) may request a current weather forecast from a group of remote weather stations 1314, which may provide the forecast without human intervention. Further, an emergency vehicle 1324 may be alerted by an automated teller machine 1320 that a burglary is in progress. As the emergency vehicle 1324 proceeds towards the automated teller machine 1320, it may access the traffic control group 1306 to request clearance to the location, for example, by lights turning red to block cross traffic at an intersection in sufficient time for the emergency vehicle 1324 to have unimpeded access to the intersection.

Clusters of IoT devices, such as the remote weather stations 1314 or the traffic control group 1306, may be equipped to communicate with other IoT devices as well as with the cloud 1300. This may allow the IoT devices to form an ad-hoc network between the devices, allowing them to function as a single device, which may be termed a fog device or system (e.g., as described above with reference to FIG. 7).

Figure 9:
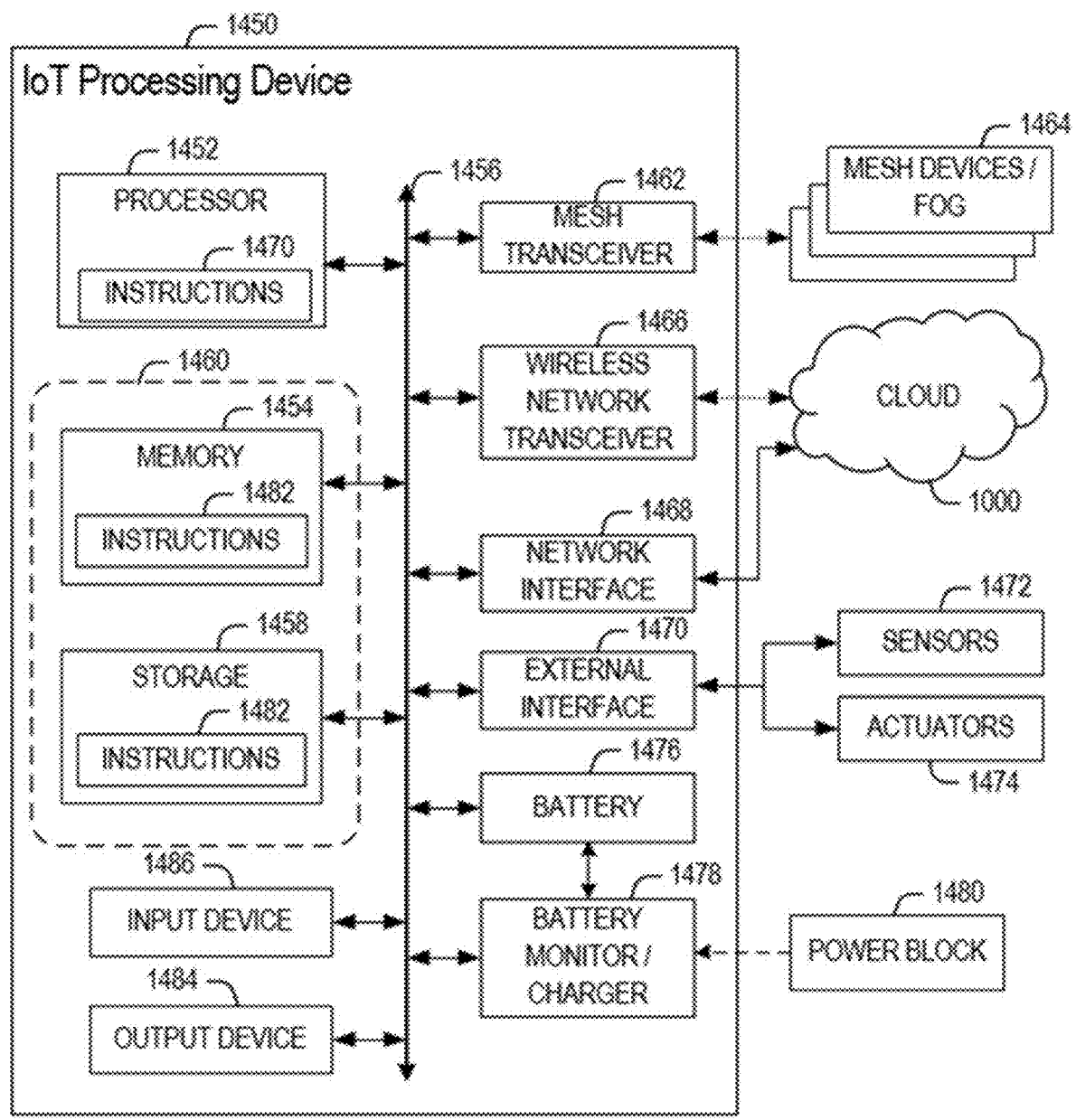
FIG. 9 illustrates a block diagram for an example IoT processing system architecture upon which any one or more of the techniques (e.g., operations, processes, methods, and methodologies) discussed herein may be performed, according to an example.

FIG. 9 is a block diagram of an example of components that may be present in an IoT device 1450 for implementing the techniques described herein. The IoT device 1450 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1450, or as components otherwise incorporated within a chassis of a larger system. Additionally, the block diagram of FIG. 9 is intended to depict a high-level view of components of the IoT device 1450. However, some of the components shown may be omitted, additional components may be present, and different arrangement of the components shown may occur in other implementations.

The IoT device 1450 may include a processor 1452, which may be a microprocessor, a multi-core processor, a multithreaded processor, an ultra-low voltage processor, an embedded processor, or other known processing element.

The processor 1452 may be a part of a system on a chip (SoC) in which the processor 1452 and other components are formed into a single integrated circuit, or a single package, such as the Edison™ or Galileo™ SoC boards from Intel. As an example, the processor 1452 may include an Intel® Architecture Core™ based processor, such as a Quark™, an Atom™ an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 1452 may communicate with a system memory 1454 over an interconnect 1456 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1458 may also couple to the processor 1452 via the interconnect 1456. In an example the storage 1458 may be implemented via a solid state disk drive (SSDD). Other devices that may be used for the storage 1458 include flash memory cards, such as SD cards, microSD cards, xD picture cards, and the like, and USB flash drives. In low power implementations, the storage 1458 may be on-die memory or registers associated with the processor 1452. However, in some examples, the storage 1458 may be implemented using a micro hard disk drive (HDD). Further, any number of new technologies may be used for the storage 1458 in addition to, or instead of, the technologies described, such resistance change memories, phase change memories, holographic memories, or chemical memories, among others.

The components may communicate over the interconnect 1456. The interconnect 1456 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1456 may be a proprietary bus, for example, used in a SoC based system. Other bus systems may be included, such as an I2C interface, an SPI interface, point to point interfaces, and a power bus, among others.

The interconnect 1456 may couple the processor 1452 to a mesh transceiver 1462, for communications with other mesh devices 1464. The mesh transceiver 1462 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1464. For example, a WLAN unit may be used to implement W-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1462 may communicate using multiple standards or radios for communications at different range. For example, the IoT device 1450 may communicate with close devices, e.g., within about 10 meters, using a local transceiver based on BLE, or another low power radio, to save power. More distant mesh devices 1464, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1466 may be included to communicate with devices or services in the cloud 1400 via local or wide area network protocols. The wireless network transceiver 1466 may be a LPWA transceiver that follows the IEEE 802.15.4, or IEEE 802.15.4g standards, among others. The IoT device 1450 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1462 and wireless network transceiver 1466, as described herein. For example, the radio transceivers 1462 and 1466 may include an LTE or other cellular transceiver that uses spread spectrum (SPA/SAS) communications for implementing high speed communications. Further, any number of other protocols may be used, such as W-Fi® networks for medium speed communications and provision of network communications.

The radio transceivers 1462 and 1466 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 1466, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1468 may be included to provide a wired communication to the cloud 1400 or to other devices, such as the mesh devices 1464. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1468 may be included to allow connect to a second network, for example, a NIC 1468 providing communications to the cloud over Ethernet, and a second NIC 1468 providing communications to other devices over another type of network.

The interconnect 1456 may couple the processor 1452 to an external interface 1470 that is used to connect external devices or subsystems. The external devices may include sensors 1472, such as accelerometers, level sensors, flow sensors, optical light sensors, camera sensors, temperature sensors, a global positioning system (GPS) sensors, pressure sensors, barometric pressure sensors, and the like. The external interface 1470 further may be used to connect the IoT device 1450 to actuators 1474, such as power switches, valve actuators, an audible sound generator, a visual warning device, and the like.

In some optional examples, various input/output (I/O) devices may be present within, or connected to, the IoT device 1450. For example, a display or other output device 1484 may be included to show information, such as sensor readings or actuator position. An input device 1086, such as a touch screen or keypad may be included to accept input. An output device 1484 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1450.

A battery 1476 may power the IoT device 1450, although in examples in which the IoT device 1450 is mounted in a fixed location, it may have a power supply coupled to an electrical grid. The battery 1476 may be a lithium ion battery, or a metal-air battery, such as a zinc-air battery, an aluminum-air battery, a lithium-air battery, and the like.

A battery monitor/charger 1478 may be included in the IoT device 1450 to track the state of charge (SoCh) of the battery 1476. The battery monitor/charger 1478 may be used to monitor other parameters of the battery 1476 to provide failure predictions, such as the state of health (SoH) and the state of function (SoF) of the battery 1476. The battery monitor/charger 1478 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1478 may communicate the information on the battery 1476 to the processor 1452 over the interconnect 1456. The battery monitor/charger 1478 may also include an analog-to-digital (ADC) convertor that allows the processor 1452 to directly monitor the voltage of the battery 1476 or the current flow from the battery 1476. The battery parameters may be used to determine actions that the IoT device 1450 may perform, such as transmission frequency, mesh network operation, sensing frequency, and the like.

A power block 1480, or other power supply coupled to a grid, may be coupled with the battery monitor/charger 1478 to charge the battery 1476. In some examples, the power block 1480 may be replaced with a wireless power receiver to obtain the power wirelessly, for example, through a loop antenna in the IoT device 1450. A wireless battery charging circuit, such as an LTC4020 chip from Linear Technologies of Milpitas, Calif., among others, may be included in the battery monitor/charger 1478. The specific charging circuits chosen depend on the size of the battery 1476, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1458 may include instructions 1482 in the form of software, firmware, or hardware commands to implement the techniques described herein. Although such instructions 1482 are shown as code blocks included in the memory 1454 and the storage 1458, it may be understood that any of the code blocks may be replaced with hardwired circuits, for example, built into an application specific integrated circuit (ASIC).

In an example, the instructions 1482 provided via the memory 1454, the storage 1458, or the processor 1452 may be embodied as a non-transitory, machine readable medium 1460 including code to direct the processor 1452 to perform electronic operations in the IoT device 1450. The processor 1452 may access the non-transitory, machine readable medium 1460 over the interconnect 1456. For instance, the non-transitory, machine readable medium 1460 may be embodied by devices described for the storage 1458 of FIG. 8 or may include specific storage units such as optical disks, flash drives, or any number of other hardware devices. The non-transitory, machine readable medium 1460 may include instructions to direct the processor 1452 to perform a specific sequence or flow of actions, for example, as described with respect to the flowchart(s) and block diagram(s) of operations and functionality depicted above.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

EXAMPLES

The following examples pertain to further embodiments.

Example 1 is an apparatus for networking comprises a detector to detect a user; and a resource discoverer to discover a network resource; wherein the detector is to signal the resource discoverer to initiate discovery of network resources accessible by an Internet-of-Things (IoT) device upon detection of a user, prior to the user issuing a command to the IoT device.

Example 2 may include the subject matter of example 1, wherein the detector is to wake the IoT device from a sleep state upon detection of the user.

Example 3 may include the subject matter of example 2, wherein the apparatus is part of the IoT device.

Example 4 may include the subject matter of any of examples 1-3, wherein the detector is to detect the user by detecting a voice prompt, physical proximity of the user, a user interaction with an interface, a visual indication of the user presence, a physical token in possession of the user, or a combination of any of the foregoing.

Example 5 may include the subject matter of any of examples 1-3, wherein the resource discoverer is to further connect the IoT device with a network resource that is discovered.

Example 6 may include the subject matter of any of examples 1-3, wherein the IoT device is to connect to accessible network resources over a wireless network.

Example 7 may include the subject matter of example 1 or 2, wherein IoT device is a first IoT device, and the accessible network resources comprise at least a second IoT device.

Example 8 may include the subject matter of example 7, wherein the user is detected by the second IoT device, which signals the resource discoverer to initiate discovery.

Example 9 is a method for networking, comprising detecting presence of a user when an Internet-of-Things (IoT) device is in a disconnected state; and initiating, on detection of the presence of the user, prior to the user issuing a command to the IoT device, a discovery of network resources; wherein on issuance of the user command, the IoT device connects to the discovered network resource; and executes user command.

Example 10 may include the subject matter of example 9, further comprising waking the IoT device from a sleep state upon detection of the user.

Example 11 may include the subject matter of example 10, wherein the method is carried out at least in part by the IoT device.

Example 12 may include the subject matter of any of examples 9-11, wherein the user is detected by detecting a voice prompt, physical proximity of the user, a user interaction with an interface, a visual indication of the user presence, a physical token in possession of the user, or a combination of any of the foregoing.

Example 13 may include the subject matter of any of examples 9-11, further comprising connecting the IoT device with a network resource that is discovered.

Example 14 may include the subject matter of any of examples 9-11, further comprising connecting the IoT device to the discovered network resources over a wireless network.

Example 15 may include the subject matter of example 9 or 10, wherein IoT device is a first IoT device, and the accessible network resources comprise at least a second IoT device.

Example 16 may include the subject matter of example 15, wherein detecting the user and initiating discovery are performed by the second IoT device.

Example 17 is a non-transitory computer-readable medium (CRM) comprising instructions to cause an Internet of Things (IoT) device manager, in response to execution of the instructions by a processor, to detect a user; and initiate, upon detection of the user, a discovery of network resources accessible by the IoT device, prior to the user issuing a command.

Example 18 may include the subject matter of example 17, wherein the instructions are to further wake an IoT device from a sleep state upon detection of the user.

Example 19 may include the subject matter of example 18, wherein the IoT device manager is part of the IoT device.

Example 20 may include the subject matter of any of examples 17-19, wherein the instructions are to further detect the user by detecting a voice prompt, physical proximity of the user, a user interaction with an interface, a visual indication of the user presence, a physical token in possession of the user, or a combination of any of the foregoing.

Example 21 may include the subject matter of any of examples 17-19, wherein the instructions are to further connect an IoT device with a network resource that is discovered.

Example 22 may include the subject matter of any of examples 17-19, wherein the instructions are to further connect an IoT device to the discovered network resources over a wireless network.

Example 23 may include the subject matter of example 17 or 18, further comprising a first IoT device, and the accessible network resources comprise at least a second IoT device.

Example 24 may include the subject matter of example 15, wherein the IoT device manager is part of the second IoT device.

Example 25 is an apparatus for networking, comprising detection means to detect a user; and discovery means to discover a network resource; wherein the detection means is to signal the discovery means to initiate discovery of network resources accessible by an Internet of Things (IoT) device upon the detection of a user, prior to the user issuing a command.

Example 26 may include the subject matter of example 25, wherein the detection means is to wake the IoT device from a sleep state upon detection of the user.

Example 27 may include the subject matter of example 26, wherein the apparatus is part of the IoT device.

Example 28 may include the subject matter of any of examples 25-27, wherein the detection means is to detect the user by detecting a voice prompt, physical proximity of the user, a user interaction with an interface, a visual indication of the user presence, a physical token in possession of the user, or a combination of any of the foregoing.

Example 29 may include the subject matter of any of examples 25-27, wherein the discovery means is to further connect the IoT device with a network resource that is discovered.

Example 30 may include the subject matter of any of examples 25-27, wherein the IoT device is to connect to accessible network resources over a wireless network.

Example 31 may include the subject matter of example 25 or 26, wherein IoT device is a first IoT device, and the accessible network resources comprise at least a second IoT device.

Example 32 may include the subject matter of example 31, wherein the user is detected by the second IoT device, which signals the discoverer means to initiate discovery.

What is claimed is:

1. An apparatus for networking, comprising:
    a detector to detect, using information related to user activity from at least two network resources from a plurality of network resources on a network, a user and a command to access an Internet-of-Things (IoT) device remote from the user, wherein access to the IoT device is to take place over the network, the IoT device among the plurality of network resources; and
    a resource discoverer to discover the plurality of network resources on the network, including the IoT device;
    wherein, upon detection of the user but prior to detection of the command to access the IoT device, the detector is to signal the resource discoverer to initiate discovery of and connect to a subset of the plurality of network resources that includes the IoT device, the subset of the plurality of network resources selected from the plurality of network resources on the basis of the information from the at least two network resources and at least in part on the basis of how the user is detected.

2. The apparatus of claim 1, wherein the detector is to wake the IoT device from a sleep state upon detection of the user.

3. The apparatus of claim 1, wherein the information from the at least two network resources the detector uses to detect the user comprises a voice prompt, physical proximity of the user, a user interaction with an interface, a visual indication of the user presence, a physical token in possession of the user, or a combination of any of the foregoing.

4. The apparatus of claim 1, wherein the resource discoverer is to further connect the IoT device with a network resource that is discovered.

5. The apparatus of claim 1, wherein the IoT device is to connect to accessible network resources over a wireless network.

6. The apparatus of claim 5, wherein the IoT device is a first IoT device, and the accessible network resources comprise at least a second IoT device.

7. The apparatus of claim 6, wherein the information used to detect the user is provided by the second IoT device and a third IoT device that is part of the accessible network resources, and the second IoT device signals the resource discoverer to initiate discovery.

8. A method for networking, comprising:
    detecting, using information related to user activity from at least two network resources from a plurality of network resources on a network, presence of a user;
    initiating, on detection of the presence of the user, prior to the user issuing a user command to access an Internet of Things (IoT) device of a plurality of IoT devices, a discovery of the plurality of network resources, the plurality of network resources including the plurality of IoT devices and at least one device that is not an IoT device, wherein the plurality of IoT devices includes a subset of IoT devices of a first type and a subset of IoT devices of a second type;
    selecting the IoT device from either the first type or second type based upon the information from the at least two network resources, and based at least in part on how the user presence was detected;
    connecting, following discovery of the IoT device, to the IoT device;
    receiving, from the user, the user command following initiation of the discovery of network resources; and
    executing the user command on the IoT device.

9. The method of claim 8, further comprising waking the IoT device from a sleep state upon detection of the user.

10. The method of claim 9, wherein the method is carried out at least in part by the IoT device.

11. The method of claim 8, further comprising connecting the IoT device with a network resource that is discovered.

12. The method of claim 8, wherein IoT device is a first IoT device, and the network resources comprise at least a second IoT device.

13. The method of claim 12, wherein detecting the user and initiating discovery are performed by the second IoT device.

14. A non-transitory computer-readable medium (CRM) comprising instructions to cause a network resource manager on an apparatus, in response to execution of the instructions by a processor of the apparatus, to:
   detect, using information related to user activity from at least two network resources from a plurality of network resources on a network to which the apparatus is coupled, a user;
   initiate, upon detection of the user and prior to the user issuing a user command to access an Internet of Things (IoT) device of a plurality of IoT devices, a discovery of the plurality of network resources, the plurality of network resources including the plurality of IoT devices and including at least one device that is not an IoT device, wherein the plurality of IoT devices includes a subset of IoT devices of a first type and a subset of IoT devices of a second type;
   select the IoT device from either the first type or second type based upon the information from the at least two network resources, and based at least in part on how the user presence was detected;
   connect following discovery but prior to command execution, to the IoT device;
   receive, from the user, the user command; and
   execute the user command with the IoT device.

15. The non-transitory CRM of claim 14, wherein the instructions are to further cause the network resource manager to wake an IoT device from a sleep state upon detection of the user.

16. The non-transitory CRM of claim 15, wherein the network resource manager is part of the IoT device.

17. The non-transitory CRM of claim 14, wherein the instructions are to further cause the network resource manager to cause an IoT device to be connected with a network resource that is discovered.

18. The non-transitory CRM of claim 14, wherein the IoT device is a first IoT device, and the network resources comprise at least a second IoT device.

19. An apparatus for networking, comprising:
   detection means to detect, using information related to user activity from at least two network resources from a plurality of network resources on a network, a user and a command to access an Internet-of-Things (IoT) device remote from the user, wherein access to the IoT device is to take place over the network, the IoT device among the plurality of network resources; and
   discovery means to discover the plurality of network resources on the network, including the IoT device;
   wherein, upon detection of the user but prior to detection of the command to access the IoT device, the detection means is to signal the discovery means to initiate discovery of and connect to a subset of the plurality of network resources that includes the IoT device, the subset of the plurality of network resources selected from the plurality of network resources on the basis of the information from the at least two network resources and at least in part on the basis of how the user is detected.

20. The apparatus of claim 19, wherein the detection means is to wake the IoT device from a sleep state upon detection of the user.

21. The apparatus of claim 19, wherein the discovery means is to further connect the IoT device with a network resource that is discovered.

22. The apparatus of claim 19, wherein the IoT device is a first IoT device, and the network resources comprise at least a second IoT device.

23. The apparatus of claim 22, wherein the second IoT device comprises the detection means, which signals the discovery means to initiate discovery.

24. The apparatus of claim 1, wherein discovery or access to the IoT device is to take place via a second one of the plurality of network resources.

25. The apparatus of claim 1, wherein the resource discoverer is to connect each of the network resources to each other to form a mesh network.

26. The apparatus of claim 24, wherein the second one of the plurality of network resources is an IoT device.

* * * * *